(12) United States Patent
Garg et al.

(10) Patent No.: US 12,719,805 B2
(45) Date of Patent: Aug. 25, 2026

(54) SYSTEM TO DETERMINE NETWORK RELIABILITY IN A COMPUTER NETWORK AND METHODS OF USE THEREOF

(71) Applicant: Microsoft Technology Licensing, LLC, Redmond, WA (US)

(72) Inventors: Pankaj Garg, Union City, CA (US); Jamie Dorea Gaudette, Kirkland, WA (US); Luis Irun-Briz, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 21 days.

(21) Appl. No.: 18/379,219

(22) Filed: Oct. 12, 2023

(65) Prior Publication Data

US 2025/0126069 A1 Apr. 17, 2025

(51) Int. Cl.
*H04L 47/267* (2022.01)
*H04L 41/0659* (2022.01)
*H04L 41/0663* (2022.01)

(52) U.S. Cl.
CPC ........ *H04L 47/267* (2022.05); *H04L 41/0661* (2023.05); *H04L 41/0663* (2013.01)

(58) Field of Classification Search
CPC ......................... H04L 47/267; H04L 41/0661; H04L 41/0663
See application file for complete search history.

(56) References Cited

U.S. PATENT DOCUMENTS 7,773,611 B2 * 8/2010 Booth, III ............. H04L 43/091 370/392
7,796,524 B1 * 9/2010 O'Connell .......... H04L 41/5003 370/252
10,320,691 B1 * 6/2019 Matthews ............... H04L 45/24
10,547,500 B1 * 1/2020 Hardman ................ H04L 43/10
11,082,338 B1 * 8/2021 Saha ....................... H04L 45/70
11,088,871 B1 * 8/2021 Lin ......................... H04L 12/66
(Continued)

FOREIGN PATENT DOCUMENTS

CN 103929319 B 2/2018
CN 113709000 A 11/2021
EP 3732832 B1 8/2022

OTHER PUBLICATIONS

International Search Report and Written Opinion received for PCT Application No. PCT/US2024/022922, International Filing Date: Apr. 4, 2024; Date of mailing: Jul. 22, 2024, 16 pages.
(Continued)

*Primary Examiner* — Nicholas P Celani
*Assistant Examiner* — Wuji Chen
(74) *Attorney, Agent, or Firm* — Foley IP Law, PLLC

(57) ABSTRACT

A system for establishing network reliability for a computer network includes a plurality of initiating nodes to transmit a plurality of packets across the network and a plurality of receiving nodes to receive the plurality of packets via the network. A portion of the plurality of packets transmitted from the initiating nodes are appended with identifiers that correspond to characteristics of entities using the network. The plurality of receiving nodes transmit acknowledgement receipts associated with packets appended with the identifiers to a network monitoring system that monitors quality of service associated with the characteristics.

19 Claims, 2 Drawing Sheets

(56) References Cited

U.S. PATENT DOCUMENTS

| | | | | |
|---|---|---|---|---|
| 11,323,948 | B2 * | 5/2022 | Magadevan | H04W 8/08 |
| 11,929,924 | B1 * | 3/2024 | Neustadter | H04L 45/566 |
| 12,243,420 | B1 * | 3/2025 | Rothschild | G08G 1/096775 |
| 2005/0083197 | A1 * | 4/2005 | Glenn | H04W 4/70 340/539.22 |
| 2007/0121626 | A1 * | 5/2007 | Shepard | H04L 43/00 370/252 |
| 2008/0049629 | A1 * | 2/2008 | Morrill | H04L 43/08 370/250 |
| 2008/0049641 | A1 * | 2/2008 | Edwards | H04L 43/0852 370/252 |
| 2008/0049775 | A1 * | 2/2008 | Morrill | H04L 41/147 370/419 |
| 2008/0052628 | A1 * | 2/2008 | Bugenhagen | H04L 41/0896 715/736 |
| 2008/0195733 | A1 | 8/2008 | Detienne et al. | |
| 2009/0031022 | A1 * | 1/2009 | Wexler | H04L 43/0858 709/224 |
| 2012/0140626 | A1 * | 6/2012 | Anand | H04L 49/506 370/235 |
| 2013/0100953 | A1 * | 4/2013 | Li | H04L 45/50 370/390 |
| 2013/0128022 | A1 * | 5/2013 | Bose | G06Q 10/0833 348/77 |
| 2013/0254378 | A1 * | 9/2013 | Meylan | H04L 47/70 709/224 |
| 2014/0068750 | A1 * | 3/2014 | Tjahjono | H04L 63/029 726/15 |
| 2014/0362681 | A1 * | 12/2014 | Bahadur | H04L 45/22 370/219 |
| 2015/0358366 | A1 * | 12/2015 | Liang | H04L 65/1069 709/227 |
| 2016/0381101 | A1 * | 12/2016 | Tse | H04L 65/764 709/219 |
| 2017/0099180 | A1 * | 4/2017 | Singh | H04L 12/4641 |
| 2019/0059017 | A1 * | 2/2019 | Rahkala | H04W 28/0278 |
| 2019/0068402 | A1 * | 2/2019 | Mazarick | H04L 63/02 |
| 2019/0222505 | A1 * | 7/2019 | Kaneko | H04L 45/122 |
| 2019/0386954 | A1 * | 12/2019 | Lau | H04L 61/2503 |
| 2020/0037226 | A1 * | 1/2020 | Magadevan | H04W 4/027 |
| 2020/0059976 | A1 * | 2/2020 | Bhatia | H04W 8/005 |
| 2020/0213212 | A1 | 7/2020 | Dillon et al. | |
| 2020/0304605 | A1 * | 9/2020 | Lin | H04N 19/89 |
| 2020/0336401 | A1 * | 10/2020 | Cociglio | H04L 43/50 |
| 2020/0382402 | A1 * | 12/2020 | Kolar | H04L 41/147 |
| 2021/0144791 | A1 * | 5/2021 | Kang | H04W 76/27 |
| 2021/0218658 | A1 * | 7/2021 | Vasseur | H04L 47/25 |
| 2021/0281491 | A1 * | 9/2021 | Yelahanka Raghuprasad | G06N 3/084 |
| 2021/0297345 | A1 * | 9/2021 | Sawyer | H04L 47/12 |
| 2021/0320820 | A1 | 10/2021 | Ruan et al. | |
| 2022/0060393 | A1 * | 2/2022 | Vasseur | H04L 45/30 |
| 2023/0024980 | A1 * | 1/2023 | Li | H04L 45/50 |
| 2023/0031921 | A1 * | 2/2023 | Devendran | H04L 45/22 |
| 2023/0179685 | A1 * | 6/2023 | Madhur Comandur | H04L 47/32 370/235 |
| 2024/0214905 | A1 * | 6/2024 | Qiu | H04W 40/24 |
| 2024/0348475 | A1 | 10/2024 | Mattes | |
| 2024/0348775 | A1 * | 10/2024 | Toma | H04N 19/176 |

OTHER PUBLICATIONS

International Search Report and Written Opinion received for PCT Application No. PCT/US2024/048041, Dec. 19, 2024, 15 pages.

"Intermediate System to Intermediate System Intradomain Routeing Information Exchange Protocol for use in Conjunction with the Protocol for Providing the Connectionless-Mode Network Service", Retrieved from: https://www.iso.org/standard/30932.html, Nov. 2002, 201 Pages.

Applegate, et al., "Coping With Network Failures: Routing Strategies For Optimal Demand Oblivious Restoration", In Proceedings of the Joint International Conference on Measurement and Modeling of Computer Systems, Jun. 10, 2004, pp. 270-281.

Awduche, et al., "RSVP-TE: Extensions to RSVP for LSP Tunnels", Retrieved From: https://datatracker.ietf.org/doc/rfc3209/, Dec. 2001, 54 Pages.

Bogle, et al., "TEAVAR: Striking the Right Utilization-Availability Balance in WAN Traffic Engineering", In Proceedings of the ACM Special Interest Group on Data Communication, Aug. 19, 2019, pp. 29-43.

Caesar, et al., "Design and Implementation of a Routing Control Platform", In Proceedings of the 2nd Symposium on Networked Systems Design & Implementation, May 2, 2005, pp. 15-28.

Elwalid, et al., "MATE: MPLS adaptive traffic engineering", In Proceedings of IEEE INFOCOM, vol. 3, Apr. 22, 2001, pp. 1300-1309.

Feamster, et al., "Guidelines for Interdomain Traffic Engineering", In Journal of ACM SIGCOMM Computer Communication Review, vol. 33, Issue 5, Oct. 1, 2003, pp. 19-30.

Feldmann, et al., "Deriving Traffic Demands for Operational IP Networks: Methodology and Experience", In Journal of IEEE/ACM Transactions on Networking, vol. 9, Issue 3, June , 2001, pp. 265-279.

Fernandez, et al., "Building Express Backbone: Facebook's New Long-Haul Network", Retrieved from: https://engineering.fb.com/2017/05/01/data-center-engineering/building-express-backbone-facebook-s-new-long-haul-network/, May 1, 2017, 7 Pages.

Filsfils, et al., "Segment Routing Architecture", Retrieved From: https://datatracker.ietf.org/doc/rfc8402/, Jul. 2018, 29 Pages.

Forrest, John, "COIN-OR linear programming solver", Retrieved From: https://github.com/coin-or/Clp, Jan. 12, 2022, 9 Pages.

Goldberg, et al., "Network Flow Algorithms", In Publication of Springer-Verlag, 1990, pp. 101-164.

Gupta, et al., "SDX: A Software Defined Internet Exchange", In Proceedings of ACM SIGCOMM, Aug. 14, 2014, pp. 551-562.

Hong, et al., "Achieving High Utilization with Software-Driven WAN", In Proceedings of ACM SIGCOMM, Aug. 27, 2013, pp. 15-26.

Hong, et al., "B4 and After: Managing Hierarchy, Partitioning, and Asymmetry for Availability and Scale in Google's Software-Defined WAN", In Proceedings of the Conference of the ACM Special Interest Group on Data Communication, Aug. 20, 2018, pp. 74-87.

Jain, et al., "B4: Experience with a Globally-Deployed Software Defined WAN", In Proceedings of the ACM SIGCOMM Conference on SIGCOMM, Aug. 12, 2013, pp. 3-14.

Jin, et al., "Dynamic Scheduling of Network Updates", In Proceedings of ACM SIGCOMM, Aug. 17, 2014, pp. 539-550.

Kandula, et al., "Calendaring for Wide Area Networks", In Proceedings of ACM SIGCOMM, Aug. 17, 2014, pp. 515-526.

Kandula, et al., "Walking the Tightrope: Responsive Yet Stable Traffic Engineering", In Journal of ACM SIGCOMM Computer Communication Review, vol. 35, Issue 4, Aug. 22, 2005, pp. 253-264.

Katz, et al., "Bidirectional Forwarding Detection", Retrieved From: https://www.rfc-editor.org/rfc/rfc5880.html, June , 2010, 46 Pages.

Katz, et al., "Bidirectional Forwarding Detection (BFD) for Multihop Paths", Retrieved from: https://www.rfc-editor.org/fc/pdfrfc/rfc5883.txt.pdf, Jun. 2010, 6 Pages.

Krishnaswamy, et al., "Decentralized cloud wide-area network traffic engineering with Blastshield", In Proceedings of the 19th USENIX Symposium on Networked Systems Design and Implementation, Apr. 4, 2022, pp. 325-338.

Krishnaswamy, et al., "OneWAN is better than two: Unifying a split WAN architecture", In Proceedings of the 20th USENIX Symposium on Networked Systems Design and Implementation, Apr. 17, 2023, pp. 515-529.

Kumar, et al., "Semi-Oblivious Traffic Engineering: The Road not Taken", In Proceedings of USENIX NSDI, Apr. 9, 2018, pp. 157-170.

Aoutaris, et al., "Inter-Datacenter Bulk Transfers with NetStitcher", In Proceedings of ACM SIGCOMM, Aug. 15, 2011, pp. 74-85.

(56) References Cited

OTHER PUBLICATIONS

Liu, et al., “Traffic Engineering with Forward Fault Correction”, In Proceedings of the ACM Conference on SIGCOMM, Aug. 17, 2014, pp. 527-538.
Medina, et al., “Traffic Matrix Estimation: Existing Techniques and New Directions”, In Proceedings of ACM SIGCOMM, Aug. 19, 2002, pp. 161-174.
Mitra, et al., “A Case Study of Multiservice, Multipriority Traffic Engineering Design for Data Networks”, In Proceedings of IEEE Globecom, Dec. 5, 1999, pp. 1077-1083.
Mizux, “OR-Tools—Google Optimization Tools”, Retrieved From: https://github.com/google/or-tools, Nov. 28, 2022, 8 Pages.
Nygren, et al., “OpenFlow Switch Specification”, Retrieved From: https://opennetworking.org/wp-content/uploads/2014/10/openflow-switch-v1.5.1.pdf, Mar. 26, 2015, 283 Pages.
Pan, et al., “Fast Reroute Extensions to RSVP-TE for LSP Tunnels”, Retrieved From: https://datatracker.ietf.org/doc/fc4090/, May 2005, 34 Pages.
Phaal, et al., “sFlow Version 5”, Retrieved From: https://sflow.org/sflow_version_5.txt, Jul. 2004, 49 Pages.
Rosen, et al., “Multiprotocol Label Switching Architecture”, Retrieved From: https://www.rfc-editor.org/rfc/rfc3031, Jan. 2001, 57 Pages.
Roughan, et al., “Traffic Engineering with Estimated Traffic Matrices”, In Proceedings of the 3rd ACM SIGCOMM Conference on Internet Measurement, Oct. 27, 2003, pp. 248-258.
Sadasivan, et al., “Architecture for IP Flow Information Export”, Retrieved from: https://www.rfc-editor.org/rfc/pdfrfc/fc5470.txt.pdf, Mar. 2009, 31 Pages.
Schlinker, et al., “Engineering Egress with Edge Fabric: Steering Oceans of Content to the World”, In Proceedings of ACM SIGCOMM, Aug. 7, 2017, pp. 418-431.
Singh, et al., “Cost-effective cloud edge traffic engineering with Cascara”, In Proceedings of 18th USENIX Symposium on Networked Systems Design and Implementation, Apr. 12, 2021, pp. 201-216.
Wang, et al., “COPE: Traffic Engineering in Dynamic Networks”, In Proceedings of the conference on Applications, technologies, architectures, and protocols for computer communications, Sep. 2006, pp. 99-110.
Yap, et al., “Taking the edge off with espresso: Scale, reliability and programmability for global internet peering”, In Proceedings of the Conference of the ACM Special Interest Group on Data Communication, Aug. 2017, pp. 432-445.
Zhang, et al., “Fast accurate computation of large-scale IP traffic matrices from link loads”, In Proceedings of ACM SIGMETRICS, Jun. 10, 2003, pp. 206-217.
Non-Final Office Action mailed on Aug. 5, 2025, in U.S. Appl. No. 18/318,687, 09 pages.
International Preliminary Report on Patentability (Chapter I) received for PCT Application No. PCT/US2024/022922, mailed on Oct. 23, 2025, 11 pages.
Notice of Allowance mailed on Dec. 30, 2025, in U.S. Appl. No. 18/318,687, 06 Pages.

* cited by examiner

SYSTEM TO DETERMINE NETWORK RELIABILITY IN A COMPUTER NETWORK AND METHODS OF USE THEREOF

INTRODUCTION

A computer network is a group of computers and/or communication devices that use a set of common communication protocols over digital interconnections. Each of the computers and/or communication devices in the computer network is called a network node. The nodes of a computer network may include personal computers, servers, networking hardware (e.g., routers, switches), and/or other specialized or general-purpose hosts. The nodes are identified by network addresses and/or hostnames. Communication data is divided into packets, and the packets are sent from a source node to a destination node. From time to time, network failures may occur at some nodes, which may worsen the overall performance of the network.

SUMMARY

A system for establishing network reliability for a computer network includes a plurality of initiating nodes to transmit a plurality of packets across the network and a plurality of receiving nodes to receive the plurality of packets via the network. A portion of the plurality of packets transmitted from the initiating nodes are appended with identifiers that correspond to characteristics of entities using the network. The plurality of receiving nodes transmit acknowledgement receipts associated with packets appended with the identifiers to a network monitoring system that monitors quality of service associated with the characteristics.

A method for determining a network reliability for a computer network includes transmitting a plurality of packets across a network from a plurality of initiating nodes to a plurality of receiving nodes. A portion of the plurality of packets transmitted from the initiating node are appended with identifiers that correspond to characteristics of entities using the network. The plurality of receiving nodes transmit acknowledgement receipts associated with packets appended with the identifiers to a network monitoring system that monitors quality of service associated with the characteristics. The network monitoring system effects a failover when the quality of service for packets associated with a specific characteristic reaches a threshold.

DETAILED DESCRIPTION

Figure 1:
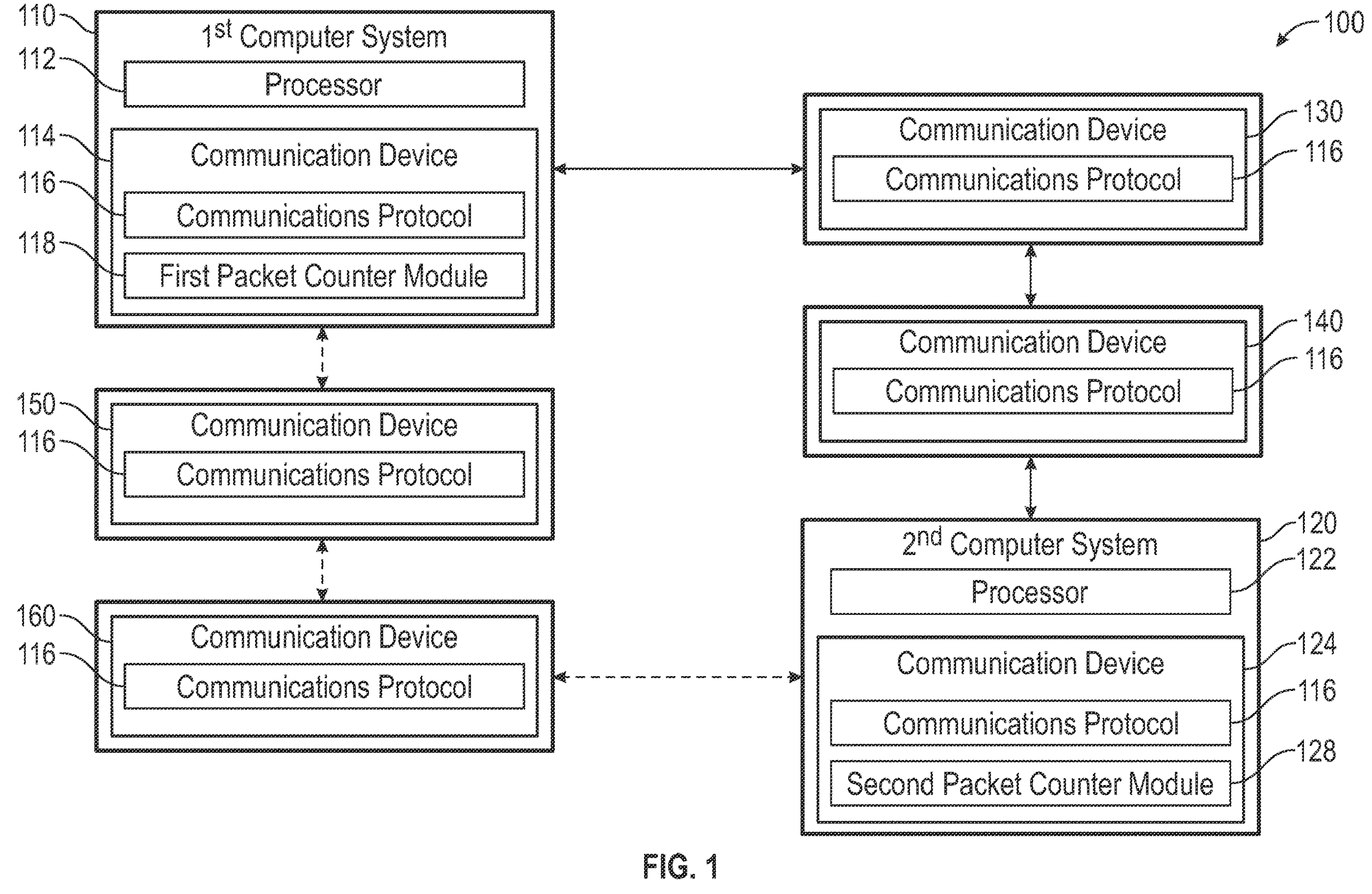
FIG. 1 illustrates an exemplary embodiment of a simplified computer network that includes a plurality of computer systems and a plurality of communication devices.

Disclosed herein is a method and/or a computer network system (hereinafter "network system" that enables a detection of end to end network loss for a particular attribute, transaction or characteristic (hereinafter "characteristic") of an entity that utilizes the network. The network system is also operative to diagnose the location of the network loss and to conduct a failover to rectify the problem so that a customer experiences no noticeable loss in system performance. In a cloud scale network, detecting network loss that is experienced by specific customers may be challenging due to the size of the network, the number of nodes (e.g., computers, servers, routers) in the network, and the number of data packets that are transmitted between these nodes. Inevitably, some network loss is a result of greedy algorithms that send more traffic than is available. However, in cases where customers are experiencing loss without exceeding their limits, this loss may be difficult to detect, as cloud networks are inherently multi-tenant, and it can be difficult to measure the impact of network loss on specific customers.

The method comprises initiating and transmitting a percentage of packets across the network with appended identifiers that correspond to the characteristics of the entities that use the network. The appended identifiers comprise a first distinct identifier (hereinafter "first identifier") and a second identifier that pertains to a specific characteristic (of the entity that uses the network) from a first node (an initiating node or a plurality of initiating nodes) to a second node (a receiving node or a plurality of receiving nodes). The distinct identifier is recognized by the second node, which then initiates and transmits an acknowledgement receipt packet back to the first node and/or to a network monitoring system. The ratio of acknowledgment receipt packets (received at the first node) to the number of packets with the first identifier initiated at the first node provides a measure of network efficiency for that specific characteristic. By correlating calculated efficiencies for packets with similar and/or different characteristics it is possible to determine quality of service for packets associated with the specific characteristic. When the quality of service reaches a threshold (e.g., a predetermined lower limit) a failover may be initiated by the network monitoring system. In an embodiment, the network monitoring system only records the number of packets with the unique identifier that are initiated at the first node and received at the second node and also records the number of acknowledgment receipts received either at the network monitor and/or at the first node. The network monitoring system may store these records for a network manager to review (e.g., for purposes of record keeping) without initiating a failover.

In an embodiment, data subsets related to network efficiency may be correlated with data subsets related to the specific characteristics to determine overlapping pathways in the network that may possibly contain malfunctioning components (e.g., nodes and links). Further diagnostic tests with routing tables may have to be performed to pinpoint the malfunctioning components. The failover may be conducted as soon as network efficiency for a particular characteristic begins to deteriorate towards a predetermined lower limit.

The first identifier is a unique identifier that is the same on all packets initiated from a particular node. Each node in the network will therefore have a first identifier that is unique to it and is different from the first identifier on another node in the network. This first identifier does not play a role in the pathway taken by the packet in the network and is not conflicted with other functions of the network. Since it plays no role in the pathway taken by the packet in the network, this method is not used to determine the efficacy of a particular pathway in the network but can provide information that overall pathway efficiency between two nodes in the network is not good. The first identifier is therefore unique to a function of determining network reliability.

The second identifier is not unique to a particular node but pertains to a specific characteristic of an activity indulged in by an entity that uses the network. The appending of this second identifier (in addition to the first distinct identifier) to a packet permits tracking of the various packets with that particular characteristic through the network via the first distinct identifier. The presence of the two identifiers permits a manager to detect network failures or slowdowns and to fix the network for any problems. A record of the number of acknowledgements received from the second node by the first node is maintained by a packet counting module located at the first node. The number of acknowledgments received by the first node from the second node for a specific characteristic may be used to provide an indication of network efficiency or reliability for that particular characteristic. It may therefore be used to compute network losses for the specific characteristics. The packet counting modules in conjunction with the network monitoring system may also correlate data subsets related to network efficiency with data subsets related to specific characteristics for different entities to facilitate an identification of malfunctioning portions of the network.

In an embodiment, the characteristic identifier appended to the packets (via the second identifier) pertains to any particular type of activity or groups of activities that a network customer engages in. For example, it may apply to an identity of the entities using the network (e.g., manufacturers, retail sales, agriculture, health care, aircraft manufacturing, or the like), any particular business activity within an entity (e.g., marketing, brand management, forecasting, finance, customer relationship management, bookkeeping, sales, investing, financial services, or the like), a particular activity across all entities engaged in a particular business (e.g., sales of adhesives manufactured by all chemical manufacturers, recycling of plastics across the chemical industry, or the like), a segment of a particular manufacturer or seller (e.g., adhesives, fluids, resins, or the like manufactured by a particular manufacturer), feature or activity of a particular customer or group of customers (e.g., sales of a particular customer or a group of customers, maintenance receipts for that same particular customer or group of customers, health care costs for a particular customer or group of customers, and so on).

In other words, the characteristic may be attributed to any genus of human activity, any groupings of genus of human activity, species of activity within a particular genus of human activity, any groupings of species of human activity, or the like, as determined by the network service provider. The characteristic can apply to any activity in a particular area (e.g., the state of Pennsylvania) or groups of areas (e.g., states of Pennsylvania, Virginia, Texas; countries of India, the United Kingdom, the United States, or the like) that the network services customers in. Examples of human activity includes conducting business, arts, education and learning, entertainment, exercise and leisure, exploration, globalization, hobbies, industrialization, innovation, law enforcement, management, medicine, navigation, governance, publishing, recreation, religious activity, resource consumption, shopping, spending, sport, transportation, traveling, defense related activity, or a combination thereof.

While each initiating node sends out a percentage of packets with only one first identifier (the first identifier is unique to that particular node), groups of these packets (with the same first identifier) may have different second identifiers (since the second identifier depends upon customer-related activities). For example, the first node may send out a first group of packets having its first identifier where the second identifier pertains to a first characteristic (e.g., adhesive sales for customer A) and a second group of packets having the same first identifier with a second identifier that pertains to a second characteristic (e.g., fluid sales for customer A). In other words, while the packets from a particular initiating node contain only one first identifier (that pertains to that particular node), different groups of packets from this initiating node may have different second identifiers respectively, where each second identifier pertains to a specific characteristic of one or more entities that uses the network. Packets from different initiating nodes in the network will therefore have different first identifiers (since each node has its own unique identifier) but may have the same second identifier (since it may be dealing with the same characteristic).

It is to be noted that the packets with the first and second identifiers initiated and transmitted from first node to the second node are only a fraction of the plurality of packets transmitted from the first node to the second node. Every packet with a first identifier also has the second identifier. Every packet with the second identifier need not always have the first identifier. In other words, all packets initiated and transmitted from the first node to the second node may have the second identifier but only a fraction of the packets contain both the first and second identifier. A packet with the first and second identifiers does not have to stop at the second node which sends the acknowledgment receipt, it may proceed further to other nodes in the network. It only has to be received at the second node in order to initiate a return packet with the acknowledgment receipt. The efficiency of packet transmission for a particular characteristic is therefore calculated by the number of acknowledgments received at the first node divided by the number of initial packets sent out with the first identifier (the distinct identifier) by the first node. In an embodiment, packets with acknowledgment receipts may also be received at a network monitoring system. The network monitoring system will be detailed later.

While the first identifier may be used to provide an approximate measure of network efficiency it does not by itself provide much indication of which malfunctioning components produce a deterioration in network efficiency. The second identifier on the other hand may be used to provide an initial road map for investigating which portions of the network are not functioning efficiently when the efficiency starts dropping from a predetermined upper limit to a predetermined lower limit (also referred to herein as a threshold). Since the second identifier relates to a particular characteristic of the entities using the network, it may be used to as a tool to identify portions of the network that are not functioning efficiently and examine those portions of the network to isolate nodes or links that are malfunctioning. This is because only a fraction of the packets that travel across the network contain identifiers that pertain to that particular characteristic.

The packets with these particular characteristics are also delivered to a variety of different receiving nodes. A correlation between network efficiency (which is determined by the first identifier) and particular characteristics and the nodes at which packets with these particular characteristics are received at (which are informed by the second identifier) may be developed and analyzed to determine which portions of the network need initial examination for malfunctioning nodes or links. If packets with two or more different characteristics are noticed to have declines in efficiency, then a reverse engineering process may be initiated to determine common nodes and links that these packets may have contacted to make an initial determination of malfunctioning components. An in-depth diagnostic analysis using routing tables may then be used to determine specific nodes and/or links that are malfunctioning to perform a failover.

If the number of initiated packets with first and second identifiers are equal to the number of packets received with an acknowledgment receipt (at a particular node), then the network has perfect reliability. By continuously transmitting a fraction of total packets with both identifiers (first and second identifiers), receiving packets with acknowledgment receipts in response (to the first identifier) and counting both sets of packets (those transmitted and those received), the health of the network may be continuously monitored. When the number of received packets with an acknowledgment receipt is less than the number of transmitted packets with the first identifier (the distinct identifier), the network may be said to be less than perfect (e.g., the network is defective) for that particular characteristics and may be diagnosed for defects in the links (that serve to facilitate communication between the nodes) or nodes. Corrective action in the form of a failover may be initiated to improve packet transmission across the network.

Set targets (predetermined thresholds) in network efficiency may be used to initiate corrective action. For example, if the ratio of received packets (with an acknowledgment receipt) to the number of transmitted packets (with the first identifier) drops to or trends towards a certain predetermined threshold (e.g., 0.95), corrective actions such as a failover may be initiated by a manager or by the network monitoring system itself.

This efficiency for a particular characteristic can therefore be continuously monitored enabling a network manager and/or the network monitoring system to detect customer impact for a particular characteristic and take corrective action. The corrective action may involve alleviating the underlying condition (such as, for example, replacing a malfunctioning node with a functioning node) or, proactively performing a failover based on a particular customer setup. The failover may involve rebooting a malfunctioning component or may include switching to a redundant or standby component (e.g., a computer server, system, hardware component, or network upon the failure or abnormal termination of the previously active application, server, system, hardware component, or network in the computer network system). The failover may also include bypassing the failed or malfunctioning component by transmitting packets along a different pathway in the network.

FIG. 1 illustrates an example of a simplified computer network 100 (also referred to as a network), including a first computer system 110, a second computer system 120, and communication devices 130, 140, 150, and 160. In embodiments, each of the communication devices 130, 140, 150, and 160 are also referred to as a node of the computer network 100. For purposes of this disclosure, the first computer system 110 and the second computer system 120 may also considered to be nodes that can initiate and receive packets. Each of the communication devices 130, 140, 150, and 160 may only transmit packets sent by the first computer system 110 or by the second computer system 120.

For purposes of this disclosure, the first computer system 110 is considered to be the only device that can initiate a packet with a first and second identifier that is received and understood by the second computer system 120. The second computer system 120 upon receiving the packet with the first and second identifiers can send a packet with an acknowledgement receipt to the first computer system 110. While this disclosure describes that communication devices 130, 140, 150, and 160 do not initiate packets with first and second identifiers or acknowledge the receipt of such packets, it is understood that in a commercial network (such as a metro network or cloud network) every device or node can initiate and transmit a packet with a distinct identifier as well as acknowledge the receipt of such a packet. Such communication devices in commercial networks can be located on the network edge or in the core of the network.

In an embodiment, the first computer system 110 includes a processor 112 and a communication device 114. The communication device 114 is configured to communicate with the other nodes over the computer network 100 via one or more communications protocols 116. The processor 112 determines what percent of the packets are provided with the first and second identifiers and transmits this information to the communication device 114. The communication device 114 is operative to send out a plurality of packets to other nodes in the computer network 100. It is further operative to send out a fraction of these packets with first and second identifiers (based on commands received from the processor 112) that can be received and recognized by one of the nodes to whom the particular packet is addressed. In an embodiment, the node to whom the packet with the first and second identifiers is addressed, is operative to recognize the first identifier and in response transmit an acknowledgment receipt back to the initiating node that this distinctive packet has been received.

In an embodiment, the processor 112 is operative to continuously monitor the health and performance of elements of the computer network such as routers, switches, firewalls, and servers via a network monitoring system (not shown). The network monitoring system may be located at a single node (for example, at the first computer system 110) or may be distributed across several nodes. If a failure is detected, such as a hardware malfunction, software crash, or loss of connectivity, the network monitoring system triggers the failover process. Once a failure is detected, the failover process is initiated. This involves notifying the appropriate failover mechanisms and management systems that the primary network node is no longer functioning as expected. The standby or backup component of the failed network node is then activated.

The first computer system 110 also includes a first packet counting module 118 that is operative to count and tally packets that are initiated and transmitted by the first computer system 110. It is further operative to count and tally packets that are initiated and transmitted with the first and second identifiers by the first computer system 110. The first packet counting module 118 is also operative to count and tally acknowledgment receipts that are received from the second computer system 120.

The communication device 114 is also in communication with a routing table (not shown) that can optionally determine that pathway that a packet takes in the network. The main purpose of a routing table is to help routers make effective routing decisions. Whenever a packet is sent through a router to be forwarded to a host on another network, the router consults the routing table to find the IP address of the destination device and the best path to reach it.

In an embodiment, the first packet counting module 118 counts and tallies packets that are initiated and transmitted with first and second identifiers by the first computer system 110 and counts and tallies acknowledgment receipts that are received from the second computer system 120. It calculates the percent of packets with the first identifier that are received by the second computer system 120 (based on the acknowledgment receipts) and facilitates a determination of the efficiency (or reliability) of the network.

In some embodiments, the packet counting module 118 is a hardware and/or software component, including one or more computer-readable hardware storage devices stored thereon. The computer-readable instructions are structured such that, when executed by the one or more processors 112, the computer-executable instructions configure the first computer system to transmit a packet with the first identifier.

The second computer system 120 also includes a processor 122 and a communication device 124, which is configured to communicate with the other nodes over the computer network 100 via the one or more communication protocols 116. Notably, the second computer system 120 may or may not include a second packet counting module 128. The second packet counting module 128 functions in much the same manner as the first packet counting module 118.

The processor 122 identifies the distinct first identifier on an incoming packet and directs the communication device 124 to acknowledge receipt by sending a packet to the first computer system 110, where it is counted and tallied by the first packet counting module 118.

In some embodiments, each of the communication devices 130, 140, 150 and 160 is a general-purpose computer system. However, in other embodiments, each or some, of the communication devices 130, 140, 150 and 160 are special-purpose devices, such as (but not limited to) a router, a switch, a relay device, or the like. At a minimum, each of the communication devices 130, 140, 150 and 160 is capable of communicating with the rest of the nodes in the computer network 100 via the one or more communication protocols 116.

The first computer system 110 and the second computer system 120 are configured to communicate with each other via different paths over the computer network 100. For example, the first computer system 110 can contact the second computer system 120 via a first path (marked by solid line arrows) including communication devices 130 and 140, or via a second path (marked by dotted line arrows) including communication devices 150 and 160. For example, depending on circumstances (e.g., the traffic among different paths, the status of the different nodes in the computer network 100, and the like), when the first computer system 110 sends a packet directed to the second computer system 120, the packet may be routed to the communication device 130 or 150. Assuming the packet happens to be routed to the communication device 130, the communication device 130 is configured to forward the packet to the communication device 140. Based at least on receiving the packet, the communication device 140 then delivers the packet to the second computer system 120.

Figure 2:
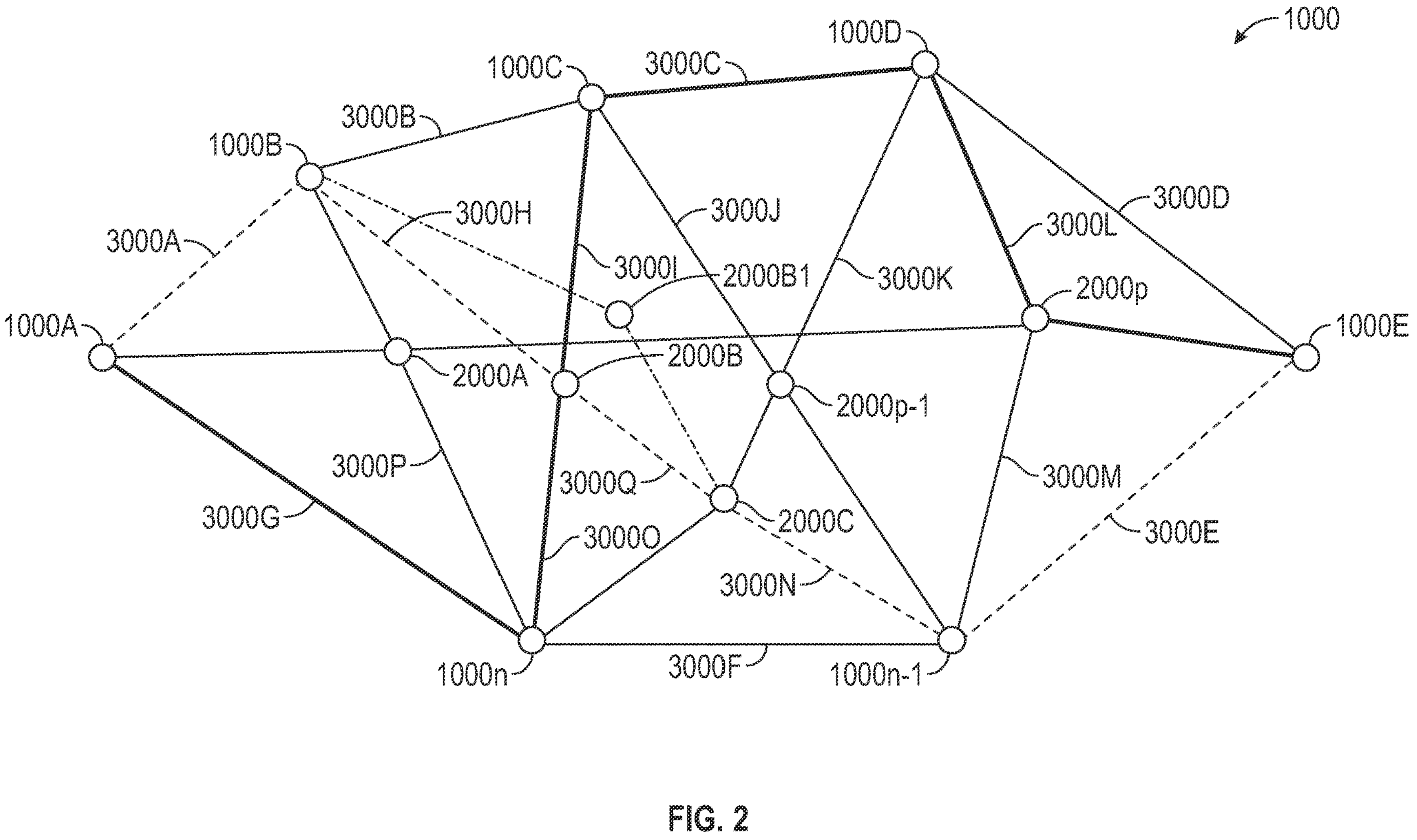
FIG. 2 illustrates another exemplary embodiment of a computer network that includes a plurality of edge nodes and core nodes.

Notably, the network 100 only includes five nodes (excluding the first computer system 110). To identify whether one of the five nodes has failed, one could perform a testing at each of the five nodes to determine whether the corresponding node works properly. However, existing commercial networks may have a much larger number of nodes and performing such testing at each node is not possible. For example, FIG. 2 illustrates another example of a computer network 1000, including a number of edge nodes 1000A-1000*n* and core nodes 2000A-2000*p*, where n and p are both integers that may be the same or different. Edge nodes are located close to the entry point of the computer network 1000, while core nodes are located away from the entry point of the computer network 1000. Each node amongst the plurality of nodes in the FIG. 2 may be a computer system, a private corporate network, a server, a router, a switch or a special or general-purpose relay device.

It is to be noted that for the purpose of computing the total number of packets that are initiated and transmitted by the network, the edge nodes and core nodes may be considered to identical and can each perform the function of initiating and transmitting a packet with the first and second identifiers and responding with an acknowledgment receipt. In other words, the edge nodes and core nodes can be assumed to have the same functionality.

Each of the nodes in the FIG. 2 is endowed with the same functionality as that of the first computer system 110 of the FIG. 1. Each node in the FIG. 2 contains at least a communication device that is configured to communicate with all of the other nodes over the computer network 1000 via one or more communications protocols, a packet counting module, a routing table, and so forth. At least one node contains a microprocessor that is operative to perform a network monitoring function (not shown) that continuously monitors the health and performance of elements of the computer network such as routers, switches, firewalls, and servers. The network monitoring system is in communication with the package counting modules at each node. In an embodiment, the acknowledgment receipts that are transmitted by each node may be received at the network monitoring system, which can maintain a continuous record of the quality of service for the network. Since the network monitoring system is in constant communication with the respective package counting modules (at each of the nodes) it can track network efficiency initiate corrective actions when quality of service for any portion of the network begins to reach a lower threshold.

Each node may also be provided by a back-up node that is endowed with the same functionality as the node itself. For example, the node 2000B is a primary node through which packets in the network are transmitted. As may be seen in the FIG. 2, node 2000B has a secondary node 2000B1 which functions as a back-up node that may be deployed in its place in the event that the node 2000B begins to malfunction. In the event of a failover, the secondary node 2000B1 is used for transmitting packets that would otherwise have been transmitted via the primary node 2000B. This backup node, often referred to as a secondary or redundant node, is usually kept synchronized with the primary component's state and configuration to ensure a seamless transition. The primary node 2000B may then be repaired or replaced. Once the primary node is restored and deemed operational again, a similar process called "failback" can be initiated to transfer responsibility back to the primary node from the secondary node.

While not depicted in the FIG. 2, a portion of the plurality of edge nodes 1000A-1000*n* and core nodes 2000A-2000*p* in the network 1000 may have a secondary node that has the same functionality as the primary node and that can be deployed to replace the primary node in the event of a failover. A node can be an initiating node, a receiving node, or both an initiating node and a receiving node.

Links 3000A, 3000B, 3000C, 3000D, 3000E. 3000F, 3000G, 3000H, . . . , 3000N, 30000, 3000P connect the various nodes 1000A, 1000B, 1000C, 1000D, 1000E . . . , 1000*n*−1, 1000*n* in the network directly with each other indirectly with each other via nodes 2000A, 2000B, 2000C . . . , 2000*p*−1, 2000*p*.

In an embodiment, the packets in a network take their own path based upon ECMP (equal cost multi-path) routing. Equal cost multi-path routing (ECMP) is a routing strategy where packet forwarding to a single destination can occur over multiple best paths with equal routing priority. The first identifier (the unique identifier) is the same on all packets that are initiated from a particular node where it is used and it is not used in ECMP computation i.e. it does not change ECMP behavior of the traffic in the network.

It is to be noted that a particular node in the network does not query itself. In an embodiment, the packets (including those with the first identifiers) may be transmitted along the network using a spanning tree protocol (STP). STP is a network protocol that builds a loop-free logical topology for ethernet networks. The basic function of STP is to prevent bridge loops and the broadcast radiation that results from them. Spanning tree also allows a network design to include backup links providing fault tolerance if an active link fails. STP thus creates a spanning tree that characterizes the relationship of nodes within a network of connected layer-2 bridges and disables those links that are not part of the spanning tree, leaving a single active path between any two network nodes. Extensions of STP such as rapid spanning tree protocol (RSTP) or multiple spanning tree protocol (MSTP) may also be used.

In one exemplary embodiment, in one method of determining network performance, the node 1000A initiates (and transmits) a first plurality of packets intended for node 1000E and a second plurality of packets intended for node 1000D. Some of the packets intended for node 1000E have a first second identifier that pertains to a first characteristic (e.g., adhesive sales) and a second second identifier that pertains to a second characteristic (e.g., fluid sales). Similarly, some of the packets intended for node 1000D have a first second identifier that is similar to the first second identifier for packets intended for node 1000E (e.g., they pertain to the first characteristic—adhesive sales), while the second second identifier for packets intended for node 1000D pertains to a third characteristic (e.g., polymer sales).

Of the packets travelling from node 1000A to 1000E, a first sub-plurality of packets travel a first pathway via nodes 1000*n*, 2000B, 1000C, 1000D and 2000*p* to reach node 1000E, a second sub-plurality of packets travel a second pathway via nodes 2000A and 2000*p* to reach node 1000E and a third sub-plurality of packets travel a third pathway via nodes 1000B, 2000B, 2000C and 1000*n*−1 to reach node 1000E. A percentage of the packets initiated by the node 1000A that are intended for the node 1000E do not reach computer system 1000E. Of the packets travelling from node 1000A to 1000D, a first sub-plurality of packets travel via a first pathway via nodes 1000B, 1000C to reach nodes 1000D, while a second sub-plurality of packets travel via a second pathway via nodes 1000*n*, 1000C, 2000*p*−1, 1000*n*−1, 2000*p* to node 1000D, while a third sub-plurality of packets travel via a third pathway via nodes 1000B, 2000A, 2000C, 1000*n*−1, 2000*p* to reach node 1000D.

Upon receiving a packet with the first identifier, the nodes 1000D and 1000E initiate an acknowledgment receipt that is delivered to the initiating node 1000A, where they are distinguished and counted by the packet counting module (not shown) located at the node 1000A.

The acknowledgment receipts initiated by nodes 1000D and 1000E have distinct identifiers too and are distinguishable from one another. They may or may not travel back along the same pathway that other packets initiated by the node 1000A travel along. The returning of a packet with an acknowledgment receipt to the node that initiates the packet with the first identifier (the distinct identifier) is sometimes referred to as a boomerang packet.

The number of acknowledgment receipts received at the node 1000A from nodes 1000D and 1000E respectively are tallied by the packet counter and ratioed against the number of packets with both the first and second identifiers initiated by node 1000A. While this ratio (which is a measure of network efficiency) provides a substantially accurate estimate of end-to-end network loss, it provides no indication of where malfunctions occur in the network when the efficiency begins to trend towards the predetermined lower limit. This end-to-end network loss can also be determined for other packets initiated from any one of the nodes 1000B, 1000C, 1000D, 1000E, 1000F . . . 1000*n*, and received by another of the nodes 1000B, 1000C, 1000D, 1000E, 1000F . . . 1000*n*. The initiating nodes are always different from the receiving nodes.

In an embodiment, if the computer network 1000 of the FIG. 2 is considered to have "n" distinct edge nodes (where the edge nodes include only those on the edge of the network 1000A, 1000B, 1000C, 1000D, 1000E . . . , 1000*n*−1, 1000*n*) where each of the nodes are capable of initiating and transmitting a packet with the first and second identifiers as well as receiving the acknowledgement receipt, then the method comprises simultaneously or sequentially initiating a plurality of packets with n first identifiers to the n receiving nodes of the network and maintaining a record of the plurality of acknowledgments received at the n different initiating nodes. If in a given period of time, the "n" nodes initiate a total of x packets of which a fraction, such as for example, y packets contain first and second identifiers, then total number of packets transmitted across a problem-free network 1000 (e.g., a network with no issues where an acknowledgment receipt is initiated for every packet with a distinct identifier) for the particular characteristic (as determined by the second identifier) would be y/x, where y is also the number of acknowledgment receipts.

If however, a percentage "g" of the x packets are lost due to network problems (such as for example, greedy algorithms), then the packet loss is reflected in the number of acknowledgment receipts received at the initiating node from the receiving node. The number of acknowledgment receipts received at the initiating node for the particular characteristic is therefore the product of g and y.

This analysis can also be applied to network system of the FIG. 2 if both edge nodes (1000A-1000*n*) and core nodes (2000A-2000*p*) are considered to have the same functionality and can initiate packets with first and second identifiers and can in turn generate and receive acknowledgment receipts as outlined above.

In an embodiment, the method may be used to identify degrading links or nodes in the network. If the network efficiency starts deteriorating, then diagnostic tools may be deployed to try and determine which particular nodes and links are performing unsatisfactorily. The second identifier is a useful tool for starting an investigation into where malfunctioning components are located. Since the second identifier pertains to a particular characteristic of an entity that uses the network, data subsets that contain the first identifier (which provides a measure of network efficiency) may be compared with subsets that contain the second identifier to establish a correlation that determines if there are overlapping nodes or links present in both subsets that may be the source of the decreased efficiency. In the example detailed above, where packets with first and second identifiers are initiated at node 1000A and transmitted to nodes 1000D and 1000E some nodes and links that are common to all the packets are shown in bolded type in the Table below.

TABLE

| Initiating Node | Pathway nodes | Receiving Node | Characteristic |
|---|---|---|---|
| 1000A | 1000B - **1000C** | 1000D | **Adhesive sales**, Polymer sales |
| 1000A | 1000n - **1000C** - 2000p-1 - **1000n-1 - 2000p** | 1000D | **Adhesive sales**, Polymer sales |
| 1000A | 1000B - **2000B - 2000C - 1000n-1 - 2000p** | 1000D | **Adhesive sales**, Polymer sales |
| 1000A | 1000n - **2000B - 1000C** 1000D - **2000p** | 1000E | **Adhesive sales**, Fluid sales |
| 1000A | 2000A - **2000p** | 1000E | **Adhesive sales**, Fluid sales |
| 1000A | 1000B - **2000B - 2000C - 1000n-1** | 1000E | **Adhesive sales**, Fluid sales |

In examining the column titled "Characteristic" it may be seen that a common characteristic from the initiating node to the receiving node is adhesive sales (shown in bolded type because it is the common characteristic). Examining the different pathways taken by packets that have adhesive sales as a common characteristic for nodes D and E, it may be seen that some nodes (shown in bolded type) are shared between the two characteristics. These nodes and the links that exist therebetween may therefore be examined initially to determine if they are potentially the source of the malfunction. By combining overlapping data subsets between packets that contain the first and second identifiers, potential malfunctioning nodes and links may be targeted for further examination.

For example from the Table it may be seen that the following nodes 1000C, 2000B, 2000C, 1000$n$-1 and 2000$p$ appear the most often. It is therefore highly probable that the malfunctioning component lies somewhere in these nodes or in links associated with these nodes. In those networks where a large number of packets with both first and second identifiers have been transmitted across the network and acknowledgment receipts are obtained, it may be possible to correlate a decrease in efficiency with nodes that packets with overlapping second identifiers were received at. This may help with determining pathways taken by packets with overlapping second identifiers (characteristics). Equations can be developed based on the data obtained from efficiently functioning pathways and inefficiently functioning pathways to pinpoint the location of malfunctioning components. Networks that have a lot of activity (transmission of packets back and forth) offer better opportunities for arriving at data-intensive solutions that pinpoint where a malfunctioning or defective component lies.

In order to determine the links and/or nodes that cause deterioration in the network with greater precision, a diagnostic process may then be initiated where the routing tables in a portion of the nodes may be activated to select the pathway that a particular packet with the first and second identifiers may travel along. The routing table may also be used to select the pathway that a packet with an acknowledgment receipt takes (since it is not initially known whether it is the packet with the distinct identifier or that with the receipt acknowledgment that is lost). The routing tables may direct a portion of the plurality of transmitted packets appended with the first and second identifiers along some of the identified potentially defective pathways to determine whether they contain malfunctioning components. Efficiencies can be determined for each of the potentially defective pathways and defective nodes or links pinpointed with greater accuracy.

A failover can then be conducted for the nodes or links in those particular pathways. Once the failover is conducted and the network efficiency is restored to a desired value, the routing tables may be deactivated (their use may be terminated for packets that contain the distinct identifiers or the acknowledgment receipts). For example, in the example represented in the Table if it is determined that the node 2000B is defective, a failover may be performed to shift its function to a backup node 2000B1.

While the aforementioned example (shown in the Table) uses only six pathways and 2 characteristics to demonstrate how a malfunctioning component may be detected, a large network with a large number of links and nodes (such as that depicted in the FIG. 2) may use a large plurality of directed pathways (as determined by a plurality of routing tables) in conjunction with a large plurality of first identifiers to determine malfunctioning portions of the network system that may be rectified by a failover. This method of defect detection is termed triangulation. In other words, if there is a deterioration in network efficiency along a particular pathway, other pathways that share common nodes and links with the particular pathway may be examined to see if some these other pathways also suffer a decline in network efficiency. Some of the common nodes and links that are shared by both pathways and characteristics may then be examined to see if they are responsible for the deterioration in network quality.

Failovers may be used to rectify deficiencies in the network and to restore network efficiency to its desired value. A network system failover is a process in which the responsibility and functionality of a network component is seamlessly transferred from a primary component or node to a standby or backup component or node (also referred to herein as a secondary component) in the event of a failure. This mechanism is often used in high-availability and fault-tolerant network architectures to ensure uninterrupted network services and minimize downtime.

With reference now to the FIG. 2, when the network efficiency begins to reduce from a predetermined higher limit (such as, for example about 1) to a predetermine lower limit (such as, for example about 0.95) that serves as a threshold, potential malfunctioning components may first be identified by examining overlapping data subsets that contain the first and second identifiers. A diagnostic process using routing tables may then be performed to determine precisely which components (nodes or links) are malfunctioning. If a failure is detected, such as a hardware malfunction, software crash, or loss of connectivity, the network monitoring system triggers the failover process. The goal of a network component failover is to maintain the availability of valuable network services despite hardware or software failures. This is particularly useful in scenarios where network downtime can lead to financial losses, compromised security, or disruptions to services. Failover mechanisms facilitate the building of resilient and fault-tolerant network infrastructures. The network monitoring system notifies the appropriate failover mechanisms and management systems (not shown here) that the primary network component (in this event primary node 2000B) is no longer functioning as expected. The failover may include a rebooting of a failed node, deployment of a standby or backup node or bypassing of a failed node by using a different pathway in the network.

Rebooting is the process by which a running portion of the network system (e.g., the node 2000B) is restarted, either intentionally or unintentionally. Reboots can be either a cold reboot (alternatively known as a hard reboot) in which the power to the system is physically turned off and back on again (causing an initial boot of the node); or a warm reboot (or soft reboot) in which the system restarts while still powered up.

If the reboot is unsuccessful, a standby or backup node (in this event the secondary node 2000B1) of the failed network primary node (in this event the primary node 2000B) is activated. The state, configuration, and active sessions of the primary node 2000B are transferred to the secondary node 2000B1. This failover involves synchronizing routing tables, session information, firewall rules, and other relevant data. The packets with distinct identifiers that were originally transmitted via node 2000B are now transmitted via node 2000B1.

After the failover, the packet (with the distinct identifier) initiated by node 1000A and transmitted to node 1000E would now travel via nodes 1000*n*, 2000B1, 1000C, 1000D and 2000*p* (not shown) prior to reaching node 1000E. Similarly, after the failover, the packet initiated by the node 1000A and transmitted to node 1000E would travel along a pathway via nodes 1000B, 2000B1, 2000C and 1000*n*−1 (shown with a different dotted line from node 1000B to node 2000B1 and then to node 2000C) prior to reaching node 1000E.

The failover mechanism ensures that the standby node is fully operational and capable of handling the network traffic. In an embodiment, various tests and validations may be performed to ensure that the failover is successful and that the secondary node is ready to take on the full operational load. Once the failover is complete and the network traffic is being handled by the secondary node 2000B1, monitoring systems continue to assess the health and performance of the network 1000. Once the primary node 2000B is restored and deemed operational again, a similar process called "fail-back" can be initiated to transfer responsibility back to the primary instance.

In another embodiment, the failover may be performed by using a routing table to redirect packets that would normally have been transported via node 2000B to other nodes that bypass it. In other words, the failover is performed by redirecting packets to other pathways that do not include a malfunctioning node. For example, a packet with a first (distinct) identifier (initiated by the node 1000A and transmitted to node 1000E) that would have normally been transmitted via nodes 1000B, 2000B, 2000C and 1000*n*−1 could be redirected by a routing table at node 1000B to the nodes 1000C and 1000*n*−1 prior to reaching node 1000E.

The failover generally facilitates an improvement in network efficiency and reliability from the predetermined lower limit to a predetermined upper limit.

The ability to quickly establish network efficiency permits the network service provider to continuously monitor the network and to quickly establish a deterioration in network quality and take corrective action via a failover. It permits the network service provider to customize network repairs for a given service provider and to perform preventative maintenance on the network if desired.

The results may also be used to rank pathways within the computer network system. The better, more efficient pathways may be rented out for a higher price versus the lesser efficient pathways. Alternatively, the more efficient pathways may be rented out to clients who desire greater efficiency because they need larger data transport capabilities or indulge in more frequent data transmissions.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A system for establishing network reliability for a computer network comprising:

a set of nodes, comprising a plurality of initiating nodes and a plurality of receiving nodes, the plurality of initiating nodes to transmit a plurality of packets across the computer network, the plurality of packets appended with identifiers that correspond to characteristics of entities using the computer network;

the plurality of receiving nodes to receive the plurality of packets via the computer network, and to transmit acknowledgement receipts associated with packets appended with the identifiers to a network monitoring system that monitors a quality of service associated with the characteristics; and the network monitoring system to determine an efficiency of packet transmission for a first predetermined characteristic based on a number of received acknowledgement receipts at a first initiating node and a number of initial packets sent out by the first initiating node with a corresponding first identifier and a respective second identifier for the first predetermined characteristic;

wherein the network monitoring system is configured to identify a potentially defective pathway based on the efficiency of packet transmission for the first predetermined characteristic;

wherein, responsive to identifying the potentially defective pathway, the network monitoring system is further configured to initiate a diagnostic process in which routing tables in a portion of the set of nodes may be activated to control a pathway for a packet having both the corresponding first identifier and the respective second identifier, the pathway comprising the potentially defective pathway, wherein identifying the potentially defective pathway comprises comparing packet transmission efficiency for the first predetermined characteristic at the first initiating node to a baseline efficiency determined for a set of packets having the respective second identifier across the plurality of initiating nodes, and determining that a deviation exceeds a predetermined threshold; and wherein the diagnostic process temporarily enforces a constrained routing policy such that the packet having both the corresponding first identifier and the respective second identifier is routed through the potentially defective pathway while other packets are excluded from the potentially defective pathway to isolate the potentially defective pathway for characteristic-specific diagnosis.

2. The system of claim 1, where the network monitoring system effects a failover when the quality of service reaches the predetermined threshold.

3. The system of claim 1, where the characteristics of the entities include at least one of a genus of human activity, a grouping of a genus of human activity, a species of activity within a particular genus of human activity, and a grouping of a species of human activity.

4. The system of claim 1, where human activity includes conducting business, arts, education and learning, entertainment, exercise and leisure, exploration, globalization, hobbies, industrialization, innovation, law enforcement, management, medicine, navigation, governance, publishing, recreation, religious activity, resource consumption, shopping, spending, sport, transportation, traveling, defense related activity, or a combination thereof.

5. The system of claim 2, where effecting the failover includes rebooting a malfunctioning node, deploying a standby node in place of the malfunctioning node, or bypassing the malfunctioning node.

6. The system of claim 5, where bypassing the malfunctioning node includes transmitting the plurality of packets via a different network pathway that excludes the malfunctioning node.

7. The system of claim 5, where deploying the standby node includes synchronizing at least one of a routing table, session information, or a firewall rule, so that network efficiency is increased from the predetermined threshold towards a predetermined higher limit.

8. The system of claim 7, where the standby node prior to the failover is synchronized with a state of the malfunctioning node and a configuration of the malfunctioning node to ensure a seamless transition.

9. The system of claim 1, where each initiating node of the plurality of initiating nodes and each receiving node of the plurality of receiving nodes in the computer network is in communication with a packet counting module.

10. The system of claim 9, where the network monitoring system is on a single network node and communicates with each packet counting module.

11. The system of claim 9, wherein the plurality of receiving nodes are each operative to recognize each of a plurality of transmitted packets with a first identifier and transmit each of the plurality of packets with an acknowledgment receipt to an initiating node; where the packet counting module at the initiating node counts packets with an acknowledgment receipt received by the initiating node and determines a network efficiency for each particular characteristic of the entities using the computer network.

12. The system of claim 10, where the network monitoring system further correlates a first data subset relating to network efficiency with a second data subset containing each particular characteristic to identify malfunctioning portions of the computer network.

13. The system of claim 12, where correlating the first data subset and the second data subset generates common pathways used by the plurality of packets in the system.

14. The system of claim 13, where the common pathways are investigated for malfunctioning nodes or malfunctioning links by transmitting packets directed by a routing table via the common pathways.

15. The system of claim 1, where each initiating node and each receiving node comprises one of a computer system, a private corporate network, a server, a router, a switch, or a special or general-purpose relay device.

16. A method for determining a network reliability for a computer network comprising:

transmitting a plurality of packets across the computer network from a plurality of initiating nodes to a plurality of receiving nodes;

the plurality of packets appended with identifiers that correspond to characteristics of entities using the computer network;

transmitting acknowledgement receipts from the plurality of receiving nodes to a network monitoring system;

determining, at the network monitoring system, an efficiency of packet transmission for a first predetermined characteristic based on a number of received acknowledgement receipts at a first initiating node and a number of initial packets sent out by the first initiating node with a corresponding first identifier and a respective second identifier for the first predetermined characteristic;

identifying a potentially defective pathway based on the efficiency of packet transmission for the first predetermined characteristic; and responsive to identifying the potentially defective pathway, initiating a diagnostic process in which routing tables may be activated to control a pathway for packets having both the corresponding first identifier and the respective second identifier, the pathway comprising at least a portion of the potentially defective pathway;

wherein the acknowledgment receipts are associated with packets appended with the identifiers;

wherein the network monitoring system monitors quality of service associated with the characteristics of the entities using the computer network; and wherein the network monitoring system effects a failover when the quality of service for packets associated with a specific characteristic reaches a threshold;

wherein identifying the potentially defective pathway comprises comparing packet transmission efficiency for the first predetermined characteristic at the first initiating node to a baseline efficiency determined for a set of packets having the respective second identifier across the plurality of initiating nodes, and determining that a deviation exceeds a predetermined threshold; and wherein the diagnostic process temporarily enforces a constrained routing policy such that a packet having both the corresponding first identifier and the respective second identifier is routed through the potentially defective pathway while other packets are excluded from the potentially defective pathway to isolate the potentially defective pathway for characteristic-specific diagnosis.

17. The method of claim 16, further comprising correlating data subsets relating to network efficiency with data subsets containing each specific characteristic to identify a malfunctioning node within the computer network.

18. The method of claim 17, where effecting the failover includes rebooting the malfunctioning node, deploying a standby node in place of the malfunctioning node, or bypassing the malfunctioning node.

19. The method of claim 18, where bypassing the malfunctioning node includes transmitting the packet with a first identifier via a different pathway that excludes the malfunctioning node.

* * * * *